US012797774B2

(12) United States Patent
Yang et al.

(10) Patent No.: US 12,797,774 B2
(45) Date of Patent: Nov. 17, 2026

(54) REDIRECTING FILTER ENDCAP

(71) Applicant: ENTEGRIS, INC., Billerica, MA (US)

(72) Inventors: Kobold Yang, Hsinchu (TW); Han Yi Wang, Hsinchu (TW); Hee Jun Yang, Songpa-gu (TW)

(73) Assignee: Entegris, Inc., Billerica, MA (US)

( * ) Notice: Subject to any disclaimer, the term of this patent is extended or adjusted under 35 U.S.C. 154(b) by 409 days.

(21) Appl. No.: 18/226,476

(22) Filed: Jul. 26, 2023

(65) Prior Publication Data

US 2024/0033662 A1 Feb. 1, 2024

Related U.S. Application Data

(60) Provisional application No. 63/393,632, filed on Jul. 29, 2022.

(51) Int. Cl.
*B01D 27/08* (2006.01)

(52) U.S. Cl.
CPC ........ *B01D 27/08* (2013.01); *B01D 2201/291* (2013.01)

(58) Field of Classification Search
CPC .............. B01D 27/08; B01D 2201/291; B01D 2201/0415; B01D 2201/295; B01D 29/21; B01D 2201/301; B01D 29/33; B01D 35/00; B01D 35/30; B01D 2201/302
See application file for complete search history.

(56) References Cited

U.S. PATENT DOCUMENTS 4,283,289 A 8/1981 Meyst
5,720,788 A * 2/1998 Puckett .............. B01D 46/0046 55/498
D513,530 S 1/2006 Chen
7,232,035 B1 * 6/2007 Crawford ............. B01D 29/906 210/232
7,771,595 B2 * 8/2010 Reynolds ............... B01D 29/21 210/450
D645,950 S 9/2011 Kenyon
(Continued)

FOREIGN PATENT DOCUMENTS

CN 100579629 C 1/2010
CN 206103452 U 4/2017
(Continued)

OTHER PUBLICATIONS

Wei Hua Ho, Mark Jermy, "Effect of Turbulence Intensity on Vortex Formation Threshold in a Jet Engine Test Cell," Conference Paper, 2011.

(Continued)

*Primary Examiner* — Waqaas Ali

(57) ABSTRACT

A filter cartridge includes a housing, a filter member disposed within the housing, and an endcap disposed within the housing between the filter member and the housing. The housing includes a first end with an inlet, a second end opposite to the first end, and an outlet. The filter member includes a first axial end that faces the first end of the housing and a second axial end that faces the second end of the housing. The endcap including an outer side that faces the first end of the housing and fins that project from the outer side of the endcap. The fins configured to redirect the fluid flowing into the filter cartridge through the inlet in the housing.

16 Claims, 5 Drawing Sheets

(56) References Cited

U.S. PATENT DOCUMENTS

| | | | | |
|---|---|---|---|---|
| 8,197,686 | B2 * | 6/2012 | Richmond | B01D 35/153 210/457 |
| D733,283 | S | 6/2015 | Larouche | |
| 9,463,409 | B2 * | 10/2016 | Lee | B01D 45/16 |
| 9,776,356 | B1 | 10/2017 | Vandalsem | |
| D813,369 | S | 3/2018 | Chiu | |
| 10,188,979 | B2 | 1/2019 | Williams | |
| D886,275 | S | 6/2020 | Avedon | |
| D916,269 | S | 4/2021 | Bushnell | |
| D921,871 | S | 6/2021 | Oh | |
| D921,872 | S | 6/2021 | Oh | |
| D921,873 | S | 6/2021 | Oh | |
| D921,876 | S | 6/2021 | Oh | |
| D930,808 | S | 9/2021 | Hsu | |
| D938,568 | S | 12/2021 | Hakozaki | |
| D956,202 | S | 6/2022 | Yang | |
| 2002/0069626 | A1 * | 6/2002 | Fiacco | F04D 25/088 55/471 |
| 2002/0189993 | A1 | 12/2002 | Lang | |
| 2007/0169445 | A1 | 7/2007 | Wright | |
| 2010/0288688 | A1 | 11/2010 | Bryson | |
| 2015/0144557 | A1 * | 5/2015 | Ly | B01D 15/00 210/260 |
| 2015/0151226 | A1 | 6/2015 | Ries | |
| 2020/0070079 | A1 | 3/2020 | Son | |
| 2020/0230527 | A1 | 7/2020 | Bayati | |
| 2021/0388848 | A1 | 12/2021 | Wang | |
| 2023/0338879 | A1 | 10/2023 | Roysdon | |
| 2024/0033662 | A1 | 2/2024 | Yang | |

FOREIGN PATENT DOCUMENTS

| | | | |
|---|---|---|---|
| CN | 209575912 | U | 12/2018 |
| CN | 211357905 | U | 8/2020 |
| CN | 215995805 | U | 3/2022 |
| CN | 114470898 | A | 5/2022 |
| CN | 216755653 | U | 6/2022 |
| JP | S63315106 | A | 12/1988 |
| TW | I415665 | B | 11/2013 |
| TW | D160117 | S | 4/2014 |
| TW | D180368 | S | 12/2016 |
| TW | D197736 | S | 6/2019 |
| TW | I747569 | B | 11/2021 |

OTHER PUBLICATIONS

Jianfeng Yao, Wenjuan Lou, Guohui Shen, Yong Guo and Yuelong Xing, Influence of Inflow Turbulence on the Flow Characteristics around a Circular Cylinder, J applied sciences, 2019.

KeeTidy Post HEPA Filter Replacement & Motor Cover, amazon.com, URL: https://www.amazon.com/KeeTidy-Replacement-Compatible-Motorhead-Cord-Free/dp/B085D95KN7/, 2020.

Zhisen Liu and Fugui Huang, "Study on the influence of turbulence intensity on vortex signal," J. Phys.: Conf. Ser., 2018.

* cited by examiner

REDIRECTING FILTER ENDCAP

FIELD

The present disclosure relates to filters for filtering fluids. In particular, the present disclosure relates to filters used for filtering materials from fluids.

BACKGROUND

Filters are used to remove containments or unwanted materials from a fluid before the fluid is dispensed. Fluids used in manufacturing, for example in the semiconductor manufacturing industry, often use filters to remove contaminants or unwanted materials from the fluid before the fluid is dispensed. Useful fluids that are processed using filters include water, liquid industrial solvent, inks, and processing fluids (e.g., in semiconductor fabrication). Unwanted materials to be removed from fluids include impurities and contaminants such as solid particles. Examples of filter applications include their use to process ultrapure aqueous solutions, organic solvent solutions, water, and the like for use in microelectronics and semiconductor processing. To perform a filtration function, a filter includes a filter member that is responsible for removing the unwanted material. The filter membrane can be contained within a housing such that liquid as it flows through the housing is filtered as the fluid passes through the housing.

SUMMARY

In an embodiment, a filter cartridge is for filtering a fluid. The filter cartridge includes a housing, a filter member disposed within the housing, and an endcap disposed within the housing. The housing includes a first end, a second end opposite to the first end, an inlet disposed in the first end of the housing, and an outlet. The filter member is configured to filter the fluid flowing through the housing from the inlet to the outlet. The filter member includes a first axial end that faces the first end of the housing and a second axial end that faces the second end of the housing. The endcap disposed between the first axial end of the filter member and the inlet in the housing. The endcap includes an outer side that faces towards the first end of the housing and a plurality of fins projecting from the outer side of the endcap. The plurality of fins each extending in a curved shape along the outer side of the endcap. The plurality of fins configured to redirect the fluid flowing into the filter cartridge through the inlet in the housing.

In an embodiment, an endcap is for a filter member in a filter cartridge. The filter cartridge includes a housing. The filter member is disposed within the housing.

The endcap includes an inward side, an outer side, and a plurality of fins that project from the outer side of the endcap. The inward side is configured to abut against or be fused to a first axial end of the filter member. The outer side is configured to face towards the housing. Each of the plurality of fins is extending in a curved shape along the outer side of the endcap. The fins are configured to redirect fluid flowing into the filter cartridge through the inlet in the housing.

DRAWINGS

Like numbers represent like features.

DETAILED DESCRIPTION

Figure 1:
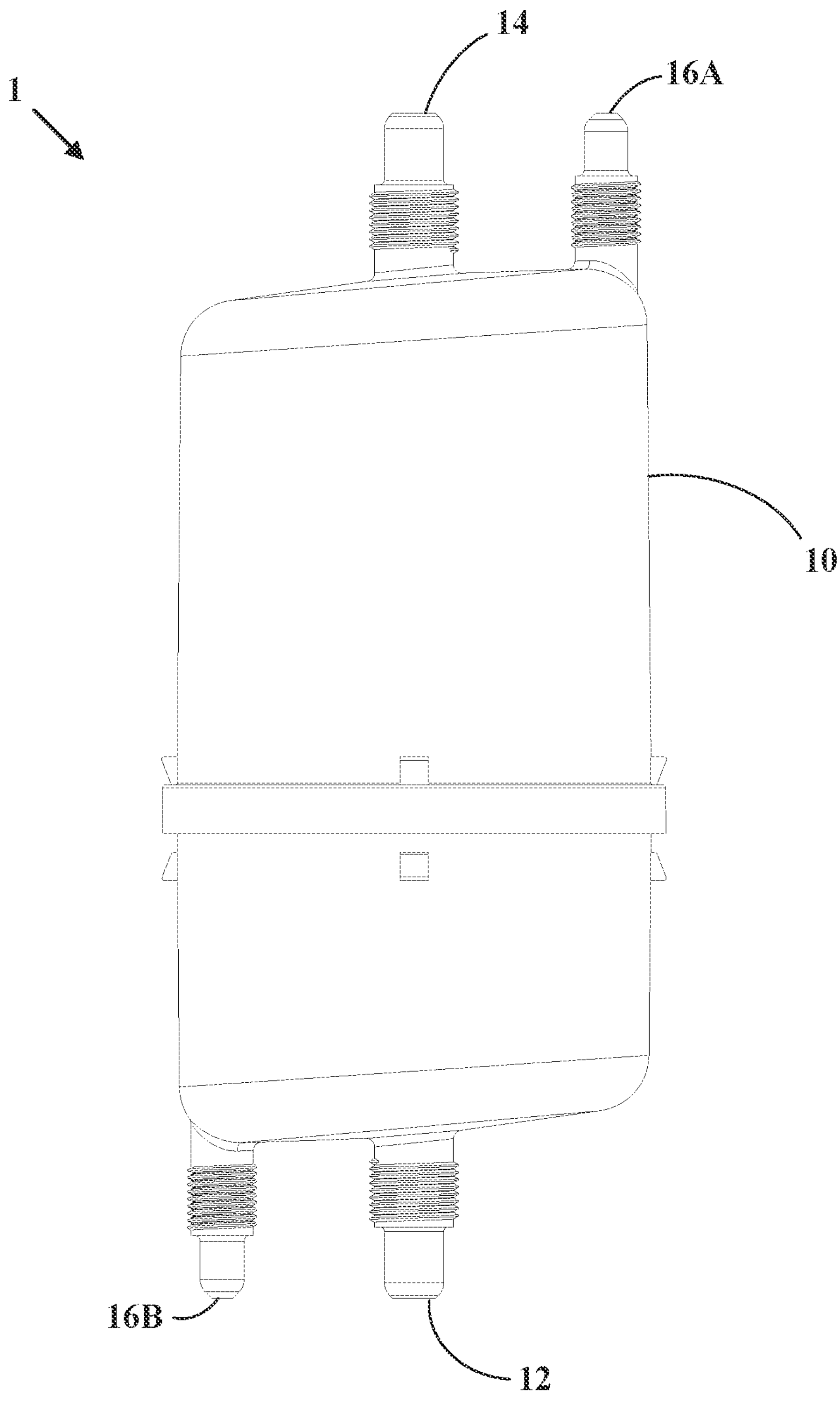
FIG. 1 is a side view of an embodiment of a filter cartridge.

FIG. 1 is a side view of an embodiment of a filter cartridge 1. The filter cartridge 1 can be a disposable filter for a single-use application in the semiconductor industry. The filter cartridge 1 includes a housing 10 with an inlet 12 and an outlet 14. Fluid F is filtered as it passes through the housing 10 from the inlet 12 to the outlet 14. The fluid F (to be filtered) flows into the filter cartridge 1 through the inlet 12, is filtered as it passes through the filter cartridge 1, and is then discharged (as filtered fluid) from the filter cartridge 1 through the outlet 14. The housing 10 can also include one or more vents 16A, 16B configured to vent gas from the housing 10. For example, gas can enter the housing 10 along with the fluid F to be filtered.

The fluid F can be a liquid used in semiconductor manufacturing (e.g., chemical mechanical planarization, wet etch and clean, photolithography etc.), ink manufacturing or use, etc. For example, the liquid can include, but is not limited to, water, ultrapure water, etching liquids, inks, solvents used in photolithography and wet etch and clean, etc. For example, the fluid F may be a slurry of the liquid and solid particles. The filter cartridge 1 is configured to remove the solid particles from the slurry. In an embodiment, fluid F may be ink that includes pigment(s) particles in a liquid. The filter cartridge 1 may be configured to remove solid non-pigment particles from the liquid/ink (e.g., with minimal removal of the pigment particles). In other embodiments, fluid F can be a solvent or other liquid used in semiconductor manufacturing where particles or other contaminants need to be removed.

Figure 2:
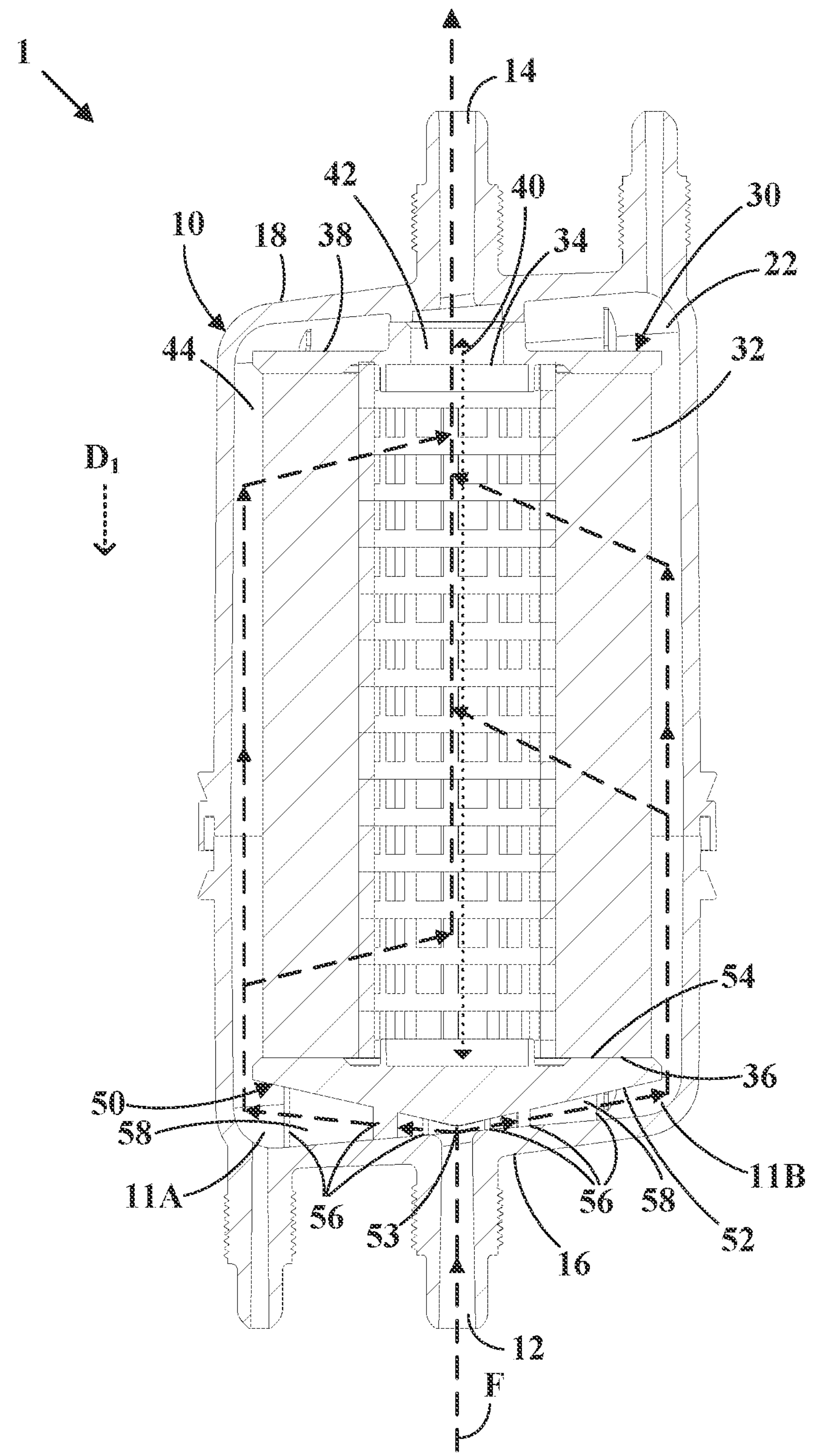
FIG. 2 is a vertical cross-sectional view of the filter cartridge in FIG. 1, according to an embodiment.

FIG. 2 is a vertical cross-sectional view of the filter cartridge 1, according to an embodiment. The vertical cross-section shown in FIG. 2 extends perpendicular to the view in FIG. 1. As shown in FIG. 2, the housing 10 includes a first end 16 and second end 18 that are opposite ends of the housing 10. The inlet 12 is located in the first end 16. The outlet 14 is located in the second end 18. The housing 10 includes an interior volume 22. For example, the components of the filter cartridge 1 are contained within the interior volume 22 of the housing 10. The filter cartridge 1 also includes a filter member 30 and an endcap 50 disposed within the housing 10. The filter member 30 and the endcap 50 disposed in the interior volume 22 of the housing 10.

As shown in FIG. 2, the fluid F passes through the filter member 30 as it flows through the cartridge 1. The filter member 30 is configured to filter the fluid F as the fluid F passes through the filter member 30. The filter member 30 includes a membrane 32 that is disposed in the interior volume 22 of the housing 10. The fluid F passes through the membrane 32 of the filter member as it flows through the filter cartridge 1 from the inlet 12 to the outlet 14. The membrane 32 of the filter member 30 is configured to filter the fluid F by allowing liquid to pass therethrough while trapping/blocking solid particles in the liquid from passing therethrough.

The filter member 30 can also include a core 34 on which the membrane 32 is supported within the housing 10. The membrane 32 has a tubular shape. As shown in FIG. 2, the core 34 can be a porous support column about which the membrane 34 is disposed/wound. The membrane 32 is a porous membrane and can have a pleated configuration. In an embodiment, suitable materials for the membrane 32 can include, but are not limited to, polyamides (e.g., polyamide nylon), polyethylene terephthalate (PET), inorganic materials (e.g., silicon based materials, silicon compounds, ceramics, etc.) polytetrafluoroethylene (PTFE), polyethylene (including ultrahigh molecular weight polyethylene (UPE)), and polysulfone.

The filter member 30 has a first axial end 36 and a second axial end 38. The first axial end 36 and the second axial end 38 being opposite ends of the filter member 30 along the longitudinal axis 40 of the filter member 38. The membrane 32 forms the inlet of the filter member 30 (e.g., the fluid F flows into the filter membrane 30 through the membrane 32). As shown in FIG. 2, the filter membrane 30 can also include an outlet 42 formed in the second axial end 38.

The first axial end 36 of the filter member 30 faces the first end 16 of the housing 10. The first axial end 36 faces towards the inlet 12 in the housing 10. The second axial end 38 of the filter member 30 faces the second end 18 of the housing 10. The second axial end 38 of the filter member 30 faces towards the outlet 14 in the housing 10. The first axial end 36 of the filter member 30 is located closer than the second axial end 38 to the first end 16 of the housing 10 (e.g., closer to the inlet 12 in the housing 10). The filter member 10 disposed within the housing 10 such that a radial gap 44 is provided between the sides of the filter member 30 and the sides of the housing 10. The radial gap 44 has a tubular shape. In an embodiment, the filter member 30 may be configured to only have its second axial end 38 in contact with the housing 10 (e.g., the first axial end 36 not contacting the housing 10).

As shown in FIG. 2, the endcap 50 is disposed within the housing 10 between the inlet 12 in the housing 10 and the first axial end 36 of the filter member 30. The endcap 50 spaces apart the first axial end 36 of the filter member 30 from the first end 16 of the housing 10 (e.g., spaced apart in a longitudinal direction $D_1$ that is parallel to the longitudinal axis 40 of the filter member 30). The endcap 50 can be made of a material that is generally inert with the fluid F. In an embodiment, the endcap 50 is made of fluoropolymer(s). For example, the material of the endcap 50 may include one or more of, but is not limited to, polypropylene (PE), polypropylene (PP), perfluoroalkoxy alkane (PFA), and PTFE.

The endcap 50 includes a first side 52 and a second side 54 opposite to the first side 52. The first side 52 faces outward/away from the filter member 30 and can be referred to as the "outer side". The second side 54 faces inward/towards the filter member 30 and can be referred to as the "inward side". As shown in FIG. 2, the inward side 54 of the endcap 50 is in contact with the first axial end 36 of the filter member 30. In an embodiment, the inward side 54 of may abut the first axial end 36 of the filter member 30. In another embodiment, the inward side 54 of the endcap 50 may be fused to the first axial end 36 of the filter member 30.

The endcap 50 includes a plurality of fins 56 on the outer side 52. The fins 56 project from the outer side 52 of the endcap 50. For example, each of the fins 56 projects from the outer side 52 in the longitudinal direction Di. The fins 56 can have a height (e.g., as measured in the longitudinal direction Di) that varies to match with the slope of the outer side 52. Each of the fins 56 can have a height (e.g., in direction $D_1$) that ensures each fin contacts the housing 10 (e.g., is in contact with the inner surface of the first end 16 of the housing 10). In an embodiment, each fin 56 may have a height that varies with the slope of the inner surface of the housing 10, so that the fin 56 remains in contact with the housing 10 along its length. The fins 56 abut against the first end 16 of the housing 10 (e.g., the inner surface of the first end 16 of the housing 10). The fins 56 space apart the outer side 52 of the endcap 50 from the first end 16 of the housing 10. The fin 56 form spaces between the outer side 52 of the endcap 50 and the second end 18 of the housing 10 (e.g., channels 58).

Each fin 56 extends in a curved shape along the outer side 52 of the endcap 50. Channels 58 are formed between the fins 56 and between the outer side 52 of the endcap 50 and the first end 16 of the housing 10. Each channel 58 is disposed between a respective pair of the fins 56. Each channel 58 is defined by a respective pair of the fins 56, an outer side 52 of the endcap, and the first end 16 of the housing 10 (e.g., an inner surface of the first end 16 of the housing 10). As the fins 56 abut against the housing 10, the fluid F flowing from the inlet 112 is directed to flow through the channels 58 between the fins 56 to flow out from between the endcap 150 and the first end 16 of the housing 10 and to reach the filter member 30.

As shown in FIG. 2, the inlet 12 in the housing 10 is fluidly connected to the filter member 30 via the channels 58. For example, the fluid F flows from the inlet 12 in the housing 10 to the filter member 30 by passing through the channels 58. The shape and configuration of the fins 56 and the channels 58 are discussed in more detail below.

The outer side 52 of the endcap 50 has a tapered shape. The outer side 52 is shaped to taper towards the inlet 12 of the housing 10. As shown in FIG. 2, the tapered shape of the outer side 52 faces towards the inlet 12 of the housing 10. For example, the apex 53 of the outer side 42 overlaps with the inlet 12 in the longitudinal direction $D_1$. The inlet 12 faces towards the outer side 52 of the endcap 50. The inlet 12 is configured to direct the fluid F towards the outer side 52 of the endcap 50. The endcap 50 is configured to redirect the fluid F as it flows from the inlet 12 into the interior volume 22 of the housing 10. The fluid flowing into the filter cartridge 1 through the inlet 12 in the housing 10 is redirected by the tapered shaped of the outer side 52 and the fins 56.

Figure 3A:
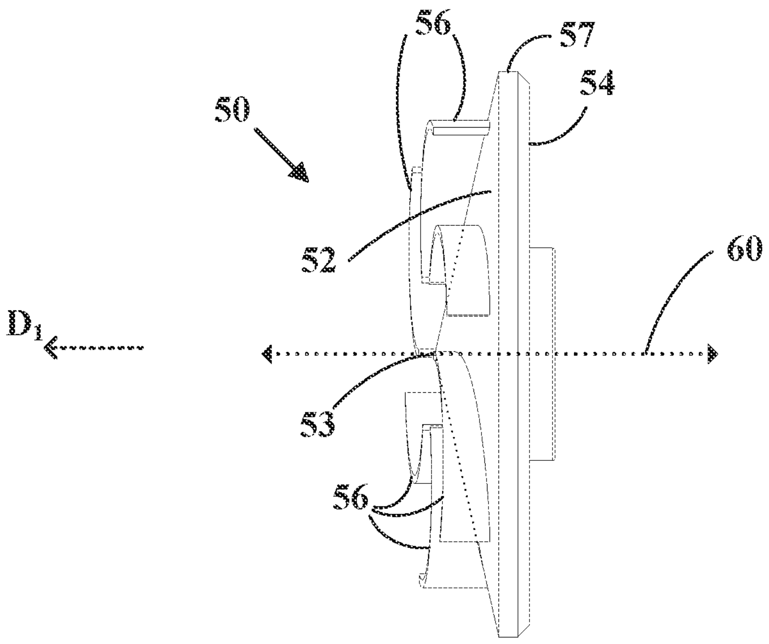
FIG. 3A is a side view of a filter endcap of the filter cartridge in FIG. 2, according to an embodiment.
Figure 3B:
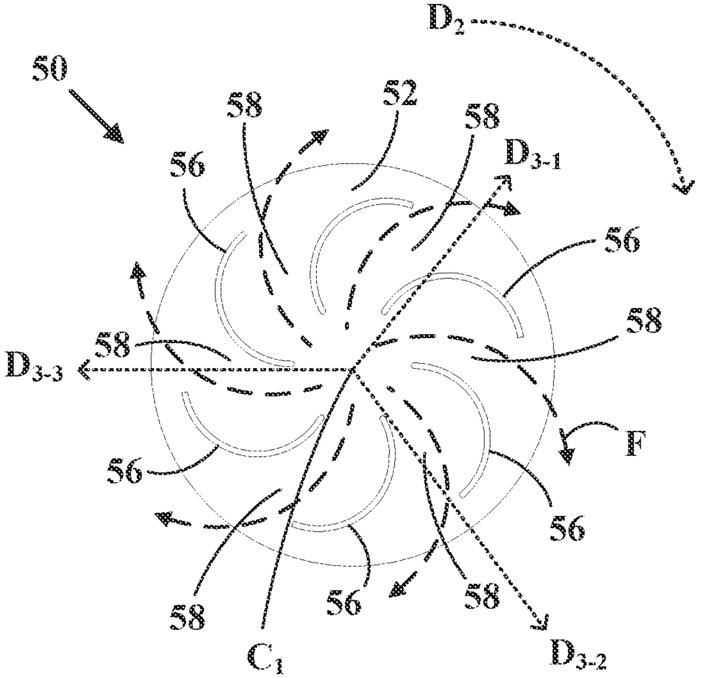
FIG. 3B is a front view of the filter endcap in FIG. 3A, according to an embodiment.

FIGS. 3A and 3B show different views of the endcap 50, according to an embodiment. FIG. 3A is a side view of the endcap 50. To help illustrate the shape of the outer side 52 of the endcap 50, portions of the curvature of the outer side 52 obscured by the fins 56 are shown in dotted lines in FIG. 3A.

As shown in FIG. 3A, the outer side 52 of the endcap has a tapered shape (e.g., tapered in direction $D_1$). The outer side 52 is angled relative to the base 57 of the endcap 50. For example, the outer side 52 is angled relative to the inner surface 54. As shown in FIG. 3A, the tapered shape of the outer side 52 is a conical shape (e.g., the outer side 52 has a rounded cone shape in FIG. 3A). In other embodiments, the outer side 52 may have a different tapered such as, not limited to, a hyperbolic shape, a pyramid shape, or the like. In an embodiment, the outer side 52 may be a flat surface.

FIG. 3B is a front view of the endcap 50. FIG. 3B includes dashed arrows indicating the flow of the fluid F along the outer side 52 of the endcap 50. Each of the fins 56 has a curved shape. For example, each of the fins 56 extends both circumferentially (e.g., along a circumferential direction $D_2$) and radially outward along the outer side 52 of the endcap 50. Circumferentially and radially as discussed herein can be relative to the longitudinal axis 60 of endcap 50 that extends through the center $C_1$ of the outer side 52 (e.g., through the apex 53 of the outer side 52). In the assembled filter cartridge 1 (e.g., as shown in FIG. 2), circumferentially and radially as discussed herein can be relative to the longitudinal axis 40 of the filter member 30 (shown in FIG. 3). As shown in FIG. 3B, the fins 56 each have a curved shape that is continuously curved. In an embodiment, a fin 56 may have a curved shape without being continuously curved. For example, a fin 56 can have a plurality connected sections (e.g., straight sections) in which the adjacent sections are angled relative to each other to form a curved shape. In FIG. 3B, the fins 56 curve in the clockwise direction (i.e., in circumferential direction $D_2$). In another embodiment, the fins 56 may be shaped to curve in the counterclockwise direction (e.g., in the opposite direction of the circumferential direction $D_2$).

As shown in FIG. 3B, the fins 56 are provided side-by-side on the outer side 52 of the endcap 50. For example, the fins 56 are provided side-by-side when traveling around the center $C_1$ or apex 53 of the outer side 52 (e.g., in the circumferential direction $D_2$). As shown in FIG. 3B, each of the fins 56 has a "C" shape and has a single curve. In another embodiment, the fins 56 may have a different shape. For example, the fins 56 may have multiple curves. The fins 56 has a shape configured to more equally radially distribute fluid without allowing the fluid to flow directly radially outward along the outer side 52 of the endcap 50.

Channels 58 are formed between the fins 56. Each channel 58 is formed between a respective pair of the fins 56. Each channel 58 is defined by a respective pair of the fins 56, the outer side 52 of the endcap 50, and the second end 18 of the housing 12 (e.g., an inner surface of the second end 18 of the housing 12). Each channel 58 extends both radially and circumferentially outward along the endcap 50.

As discussed above, the fluid F flows from the inlet 12 towards the outer side 52 of the endcap 50. For example, the fluid is generally directed at or about the center $C_1$ of the outer side 52 of the endcap 50 (e.g., at the apex 53 of the tapered outer side 52). The fluid F then flows radially outward along the outer side 52. The fins 56 redirect the fluid to flow circumferentially while flowing radially outward. For example, the fins 56 as shown in FIG. 3B redirect the fluid to flow clockwise while flowing radially outward. The fins 56 prevent the fluid from flowing in a direct radial outward direction along the endcap 50. The fluid is discharged from each of the channels 58 at an angle relative to directly radially outward (e.g., in radial direction $D_{3-1}$, in radial direction $D_{3-2}$, in radial direction $D_{3-3}$, etc.). The redirecting of the fluid F by the fins 56 and tapered shape of the outer side 52 can advantageously prevent/reduce vortexes from forming in the corners 11A, 11B of the housing 10 closest to its first end 16 (e.g., in the bottom corners 11A, 11B of the housing 10 in FIG. 2). The fins 56 may also decrease the formation of bubbles in the fluid. This can improve fluid flow through the filter cartridge 1.

Figure 4:
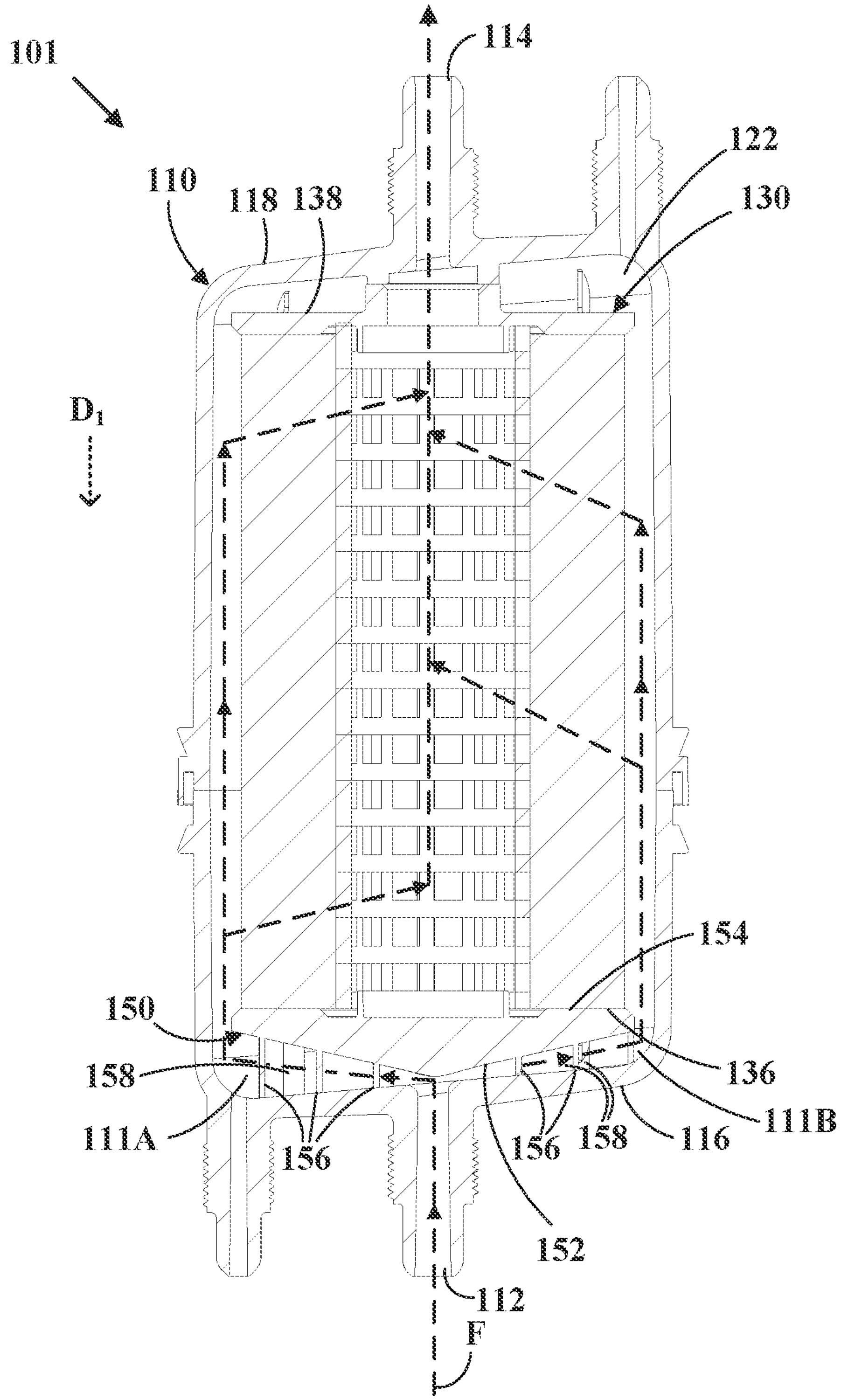
FIG. 4 is a vertical cross-sectional view of an embodiment of a filter cartridge.

FIG. 4 is a cross sectional view of an embodiment of a filter cartridge 101. The filter cartridge 101 can be a disposable filter for a single-use application in the semiconductor industry. The filter cartridge 101 is configured to filter a fluid F similar to the filter cartridge 1 in FIGS. 1 and 2. For example, fluid F is filtered as it passes through filter cartridge 101 from the inlet 112 to the outlet 114.

Unless described otherwise, the filter cartridge 101 generally has a similar structure to filter cartridge 101 in FIGS. 1 and 2. The filter cartridge 101 includes a housing 110, a filter member 130 disposed within the housing 110, and an endcap 150 disposed within the housing 110. The endcap 150 includes a plurality of fins 156. The filter cartridge 101 can have a similar configuration to the filter cartridge 1 in FIGS. 1 and 2, except for the configuration of the fins 156 on the endcap 150. For example, the filter member 101 includes a first axial end 136 that faces a first end 116 of the housing 110 and a second axial end 136 that faces a second end 118 of the housing 110, and the endcap 150 includes an outer side 152 that faces the inlet 112 in the housing 110 and an inward side 154 in contact with the first axial end 136 of the filter member 150. The outer side 152 of the endcap 150 is tapered towards the inlet 112.

The endcap 150 is configured to redirect the fluid F as it flows from the inlet 112 into the interior volume 122 of the housing 110. The fluid flowing into the filter cartridge 101 through the inlet 112 in the housing 110 is redirected by the tapered shape of the outer side 152 and the fins 156.

The fins 156 of the endcap 150 in FIG. 4 provide a similar spacing between the housing 110 and the outer side 152 of the endcap 150 as discussed above for the fins 56 of the endcap 50 in FIG. 2. For example, the end of the fins 156 contact/abut the first end 116 of the housing 110 and space apart the outer side 152 of the endcap 150 from the first end 116 of the housing 110 (in the longitudinal direction $D_1$).

A channel 158 is formed between the fins 156 and between the outer side 152 of the endcap 150 and the first end 116 of the housing 110. The channel 158 is defined the fins 156 (e.g., the sides of the fins 156), the outer side 152 of the endcap 150, and the first end 116 of the housing 110 (e.g., an inner surface of the first end 116 of the housing 110). As shown in FIG. 4, the inlet 112 in the housing 110 is fluidly connected to the filter member 130 via the channel 158. For example, the fluid F flows from the inlet 112 in the housing 110 to the filter member 130 by passing through the channel 158.

Figure 5A:
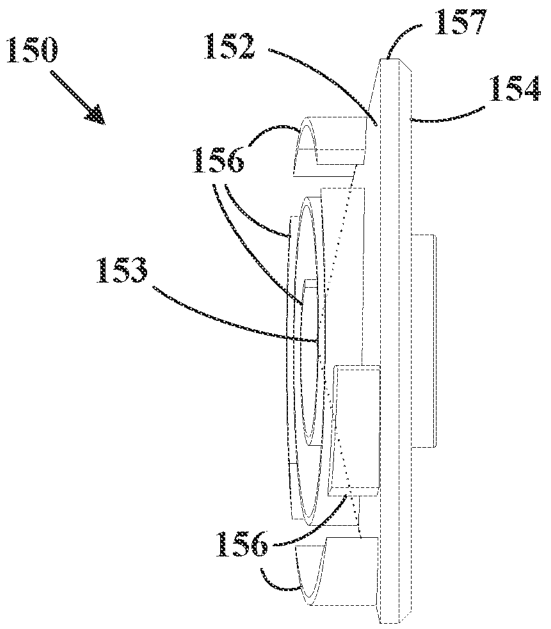
FIG. 5A is a side view of a filter endcap of the filter cartridge in FIG. 4, according to an embodiment.
Figure 5B:
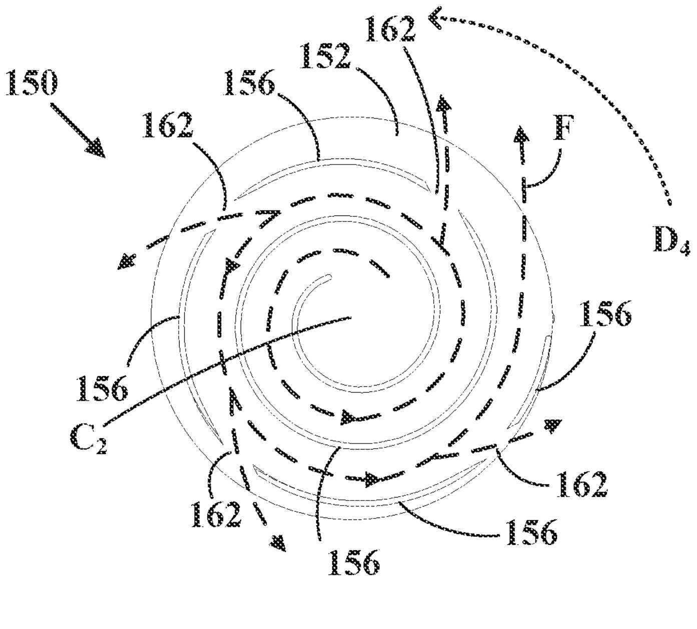
FIG. 5B is a front view of the filter endcap in FIG. 5A, according to an embodiment.

FIGS. 5A and 5B show different views of the endcap 150, according to an embodiment. FIG. 5A is a side view of the endcap 150. To help illustrate the shape of the outer side 152 of the endcap 150, portions of the curvature of the outer side 152 obscured by the fins 156 are shown in dotted lines in FIG. 5A. As shown in FIG. 5A, the outer side 152 of the endcap has a tapered shape (e.g., tapered in direction $D_1$). The outer side 152 is angled relative to the base 157 of the endcap 150. For example, the outer side 152 is angled relative to the inner surface 154 of the endcap 150. As shown in FIG. 5A, the tapered shape of the outer side 152 is a conical shape (e.g., the outer side 152 has a rounded cone shape in FIG. 5A). In other embodiments, the outer side 152 may have a different tapered such as, not limited to, a pyramid shape, or the like.

FIG. 5B is a front view of the endcap 150. FIG. 5B includes dashed arrows indicating the flow of the fluid F along the outer side 152 of the endcap 150. Each of the fins 156 has a curved shape. For example, each of the fins 156 extends both circumferentially (e.g., along a circumferential direction $D_4$) and radially outward along the outer side 52 of the endcap 50. In FIG. 5B, the fins 156 each a curved shape that is continuously curved. In an embodiment, a fin 156 may have a curved shape without being continuously curved. For example, a fin 156 can have a plurality of connected sections (e.g., straight sections) in which the adjacent sections are angled relative to each other to form a curved shape.

As shown in FIG. 5B, the fins 156 are provided end-to-end on the outer side 152 of the endcap 150. For example, the fins 156 are provided end-to-end such that the fins 156 form a spiral that extends circumferential and radially outward along the outer side 152 of the endcap 150. Each fin 156 forming a section of the spiral. In FIG. 5B, the fins 156 are aligned to form a perfect spiral. In another embodiment, the spiral formed the by the fins 156 may not form a perfect spiral. For example, one or more of the fins 156 be slightly angled relative to the angle for a perfect spiral (e.g., at or less than 30 degrees different from the angle for forming a perfect spiral). For example, one or more of the fins 156 may have modified shape that is different than the shape to form a perfect spiral shape.

Radial openings 162 are provided between the ends of the fins 156. A respective radial opening 162 is provided between the ends of each circumferentially adjacent pair of the fins 156 that are end-to-end. The radial openings 162 are formed in the outermost leg of spiral formed by the fins 156. The radial openings 162 are provided the fluid F is more equally distributed circumferentially from between the endcap 150 and the filter member 130. The endcap 150 includes four radial openings 162. It should be appreciated that the endcap 150 may include a different number of radial openings 162. In an embodiment, the endcap 150 may include at least two of the radial openings 162. In an embodiment, the endcap 150 may include at least three radial openings 162. The size of the radial openings 162 can be the same or different. In an embodiment, the size of each of the radial openings 162 is selected such that the fluid F is equally circumferentially distributed/discharged from between the endcap 150 and the filter member 130 into the open volume 122 of the housing 110.

In FIG. 5B, the fins 156 form a spiral that extends 2.6 rotations. In an embodiment, the fins 156 form a spiral that extends at least 1.0 rotations. In an embodiment, the fins 156 form a spiral that extends greater than 1.0 rotations. In an embodiment, the fins 156 form a spiral that extends at least 1.5 rotations. In an embodiment, the fins 156 form a spiral that extends at least 2.0 rotations. In FIG. 5B, the fins 156 spiral outward in a counterclockwise direction (i.e., in circumferential direction $D_4$). In another embodiment, the fins 156 may spiral outward in the counterclockwise direction (e.g., in the opposite direction of the circumferential direction $D_4$).

The channel 158 is formed between the fins 156. The channel 158 extends between the fins 156. The channel 158 has a spiral shape that is the space between the turns of the spiral formed by the fins 156. The channel 158 is defined by the fins 156 and the outer side 152 of the endcap 150. In the assembled filter cartridge 101 (e.g., as shown in FIG. 4), the channel 158 is also defined by the second end 18 of the housing 12 (e.g., an inner surface of the second end 18 of the housing 12). The channel 158 extends both circumferentially and radially outward along the outer side 152 of the endcap 150. The radial openings 162 are provided along the channel 158.

As similarly discussed above, the fluid F is directed to flow from the inlet 112 towards the outer side 152 of the endcap 150. For example, the fluid is generally directed at or about the center $C_2$ (e.g., at the apex 153) of the outer side 152 of the endcap 150. The fluid F is then directed into the channel 158. As shown in FIG. 5B, the fluid F flows through the channel 158 and is discharged from the end of the channel 158 and through the radial openings 162 (e.g., a portion of the fluid F is discharged from the end of the channel 158 and other portions of the fluid discharged from the channel 158 through the radial openings 162 as the fluid flows through the channel 158). The fluid F is discharged from the channel 158 (e.g., through the end of the channel 158 and through the radial openings 162) in a plurality of directions as shown in FIG. 5B. The fluid is discharged from the channel 158 in directions that are each angled relative to directly radially outward. The redirecting of the fluid F by the fins 156 can advantageously prevent/reduce vortexes from forming in the corners 111A, 111B of the housing 110 closest to its first end 116 (e.g., in the bottom corners 111A, 111B of the housing 110 in FIG. 4). The fins 156 may also decrease the formation of bubbles in the fluid. This can improve fluid flow through the filter cartridge 1.

Computational fluid modeling was used to measure turbulence intensity within a conventional filter cartridge, the filter cartridge 1 of FIG. 2, and the filter cartridge 101 of FIG. 4. For example, the conventional filter cartridge used an endcap that had a flat outer surface. The conventional cartridge had an average value of the turbulence intensity of ~70%. The filter cartridge 1 of FIG. 2 had an average value of the turbulence intensity of ~42%. The filter cartridge 1 of FIG. 4 had an average value of the turbulence intensity of ~26%. Thus, the endcap 50 of the filter cartridge 1 and the endcap 150 of the filter cartridge 101 each provided improved fluid flow with reduced turbulence (e.g., reduced turbulence flowing through the corners 11A/111A, 11B/111A of interior volume 22/122).

Aspects:

Any of Aspects 1-13 may be combined with any of Aspects 14-20.

Aspect 1. A filter cartridge, comprising: a housing including a first end, a second end opposite to the first end, an inlet disposed in the first end of the housing, and an outlet; a filter member disposed within the housing, the filter member configured to filter liquid flowing through the housing from the inlet to the outlet, the filter member including a first axial end facing the first end of the housing and a second axial end facing the second end of the housing; an endcap disposed between the first axial end of the filter member and the inlet in the housing, the endcap including: an outer side facing towards the first end of the housing, and a plurality of fins projecting from the outer side of the endcap, the plurality of fins each extending in a curved shape along the outer side of the endcap, and the plurality of fins configured to redirect the liquid flowing into the filter cartridge through the inlet in the housing.

Aspect 2. The filter cartridge of Aspect 1, wherein the plurality of fins are configured to redirect the liquid flowing into the housing through the inlet to flow circumferentially and radially outward relative to a longitudinal axis of the filter member, and the plurality of fins configured to prevent the liquid from flowing in a direct radial outward direction along the endcap.

Aspect 3. The filter cartridge of Aspect 2, wherein the plurality of fins are configured to redirect the liquid flowing into the housing through the inlet to flow radially outward and one of clockwise or counter-clockwise relative to the axis of the filter member.

Aspect 4. The filter cartridge of any one of Aspects 1-3, wherein one or more channels are formed between the plurality of fins, the inlet in the housing fluidly connected to the filter member via the channels.

Aspect 5. The filter cartridge of any one of Aspects 1-4, wherein the first axial end of the filter member is spaced apart from the housing by the endcap, and the outer side of the endcap is spaced apart from the housing by the fins.

Aspect 6. The filter cartridge of any one of Aspects 1-5, wherein the outer side is shaped to taper towards the inlet of the housing.

Aspect 7. The filter cartridge of any one of Aspects 1-6, wherein the outer side of the endcap has a conical shape that tapers towards the inlet of the housing.

Aspect 8. The filter cartridge of any one of Aspects 1-7, wherein the inlet in the housing faces towards the outer side of the endcap, the inlet configured to direct the liquid to flow toward the outer side of the endcap.

Aspect 9. The filter cartridge of any one of Aspects 1-8, wherein the endcap has an inward side that abuts or is fused to the first axial end of the filter member, the inward side of the endcap being opposite to the outer side of the endcap.

Aspect 10. The filter cartridge of any one of Aspects 1-9, wherein the fins extend end-to-end along the outer side of the endcap.

Aspect 11. The filter cartridge of any one of Aspects 1-10, wherein radial openings are provided between ends of the fins, the liquid configured to be directed to flow out from between the first axial end of filter member and the first end of the housing through the radial openings.

Aspect 12. The filter cartridge of any one of Aspects 1-9, wherein the fins extend side-by-side along the outer side of the endcap.

Aspect 13. The filter cartridge of any one of Aspects 1-12, wherein the housing defines an interior volume, the filter member and the endcap being disposed in the interior volume of the housing.

Aspect 14. The filter cartridge of any one of Aspects 1-13, wherein the filter cartridge is configured to filter the liquid.

Aspect 15. An endcap for a filter member in a filter cartridge, the filter cartridge including a housing and the filter member disposed within the housing, the endcap comprising: an inward side configured to abut against or be fused to a first axial end of the filter member; an outer side configured to face towards the housing; and a plurality of fins projecting from the outer side of the endcap, the plurality of fins each extending in a curved shape along the outer side of the endcap, the plurality of fins configured to redirect the liquid flowing into the filter cartridge through an inlet in the housing.

Aspect 16. The endcap of Aspect 15, wherein the endcap is configured to space apart the first axial end of the filter member from the housing, and the plurality of fins configured to space apart the outer side of the endcap from the housing.

Aspect 17. The endcap of any one of Aspects 15 and 16, wherein the outer side is shaped to taper towards an inlet of the housing.

Aspect 18. The endcap of any one of Aspect 17, wherein the outer side has a conical shape that tapers towards the inlet of the housing.

Aspect 19. The endcap of any one of Aspects 15-18, wherein the fins extend end-to-end along the outer side of the endcap.

Aspect 20. The endcap of any one of Aspects 15-19, wherein radial openings are provided between ends of the fins, the liquid configured to be directed to flow radially outward from between the first axial end of filter and the first end of the housing through the radial openings.

Aspect 21. The endcap of any one of Aspects 15-18, wherein the fins extend side-by-side along the outer side of the endcap.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A filter cartridge, comprising:

a housing including a first end, a second end opposite to the first end, an inlet disposed in the first end of the housing, and an outlet;

a filter member disposed within the housing, the filter member configured to filter liquid flowing through the housing from the inlet to the outlet, the filter member including a first axial end facing the first end of the housing and a second axial end facing the second end of the housing;

an endcap disposed between the first axial end of the filter member and the inlet in the housing, the endcap including:

an outer side facing towards the first end of the housing, the outer side having a tapered shape that tapers towards the inlet of the housing, and a plurality of fins projecting from the outer side of the endcap, the plurality of fins each extending in a curved shape along the outer side of the endcap, each of the plurality of fins projecting from the outer side in a longitudinal direction parallel to a longitudinal axis of the filter membrane, the plurality of fins abutting against an inner surface of the first end of the housing, the plurality of fins spacing apart the outer side of the endcap from the first end of the housing in the longitudinal direction and the plurality of fins configured to redirect the liquid flowing into the filter cartridge through the inlet in the housing wherein one or more channels are formed between the plurality of fins, between the outer side of the endcap and the inner surface of the first end of the housing, the inlet in the housing fluidly connected to the filter member via the one or more channels.

2. The filter cartridge of claim 1, wherein the plurality of fins are configured to redirect the liquid flowing into the housing through the inlet to flow circumferentially and radially outward relative to a longitudinal axis of the filter member, and the plurality of fins configured to prevent the liquid from flowing in a direct radial outward direction along the endcap.

3. The filter cartridge of claim 2, wherein the plurality of fins are configured to redirect the liquid flowing into the housing through the inlet to flow radially outward and one of clockwise or counter-clockwise relative to the axis of the filter member.

4. The filter cartridge of claim 1, wherein one or more channels are formed between the plurality of fins, the inlet in the housing fluidly connected to the filter member via the channels.

5. The filter cartridge of claim 1, wherein the first axial end of the filter member is spaced apart from the housing by the endcap, and the outer side of the endcap is spaced apart from the housing by the fins.

6. The filter cartridge of claim 1, wherein the inlet in the housing faces towards the outer side of the endcap, the inlet configured to direct the liquid to flow toward the outer side of the endcap.

7. The filter cartridge of claim 1, wherein the endcap has an inward side that abuts or is fused to the first axial end of the filter member, the inward side of the endcap being opposite to the outer side of the endcap.

8. The filter cartridge of claim 1, wherein the fins extend end-to-end along the outer side of the endcap.

9. The filter cartridge of claim 1, wherein radial openings are provided between ends of the fins, the liquid configured to be directed to flow out from between the first axial end of filter member and the first end of the housing through the radial openings.

10. The filter cartridge of claim 1, wherein the fins extend side-by-side along the outer side of the endcap.

11. The filter cartridge of claim 1, wherein the housing defines an interior volume, the filter member and the endcap being disposed in the interior volume of the housing.

12. An endcap for a filter member in a filter cartridge, the filter cartridge including a housing and the filter member disposed within the housing, the endcap comprising:

an inward side configured to abut against or be fused to a first axial end of the filter member;

an outer side configured to face towards a first end of the housing, the outer side having a tapered shaper; and a plurality of fins projecting from the outer side of the endcap, each of the plurality of fins projecting from the outer side in a direction away from the inward side, each of the plurality of fins having a height, as measured in the direction away from the inward side, that varies along a length of the respective fin, the plurality of fins each extending in a curved shape along the outer side of the endcap, the plurality of fins configured to redirect the liquid flowing into the filter cartridge through an inlet in the housing.

13. The endcap of claim 12, wherein the endcap is configured to space apart the first axial end of the filter member from the housing, and the plurality of fins configured to space apart the outer side of the endcap from the housing.

14. The endcap of claim 12, wherein the fins extend end-to-end along the outer side of the endcap.

15. The endcap of claim 14, wherein radial openings are provided between ends of the fins, the liquid configured to be directed to flow radially outward from between the first axial end of filter and the first end of the housing through the radial openings.

16. The endcap of claim 12, wherein the fins extend side-by-side along the outer side of the endcap.

* * * * *